Figure 1:
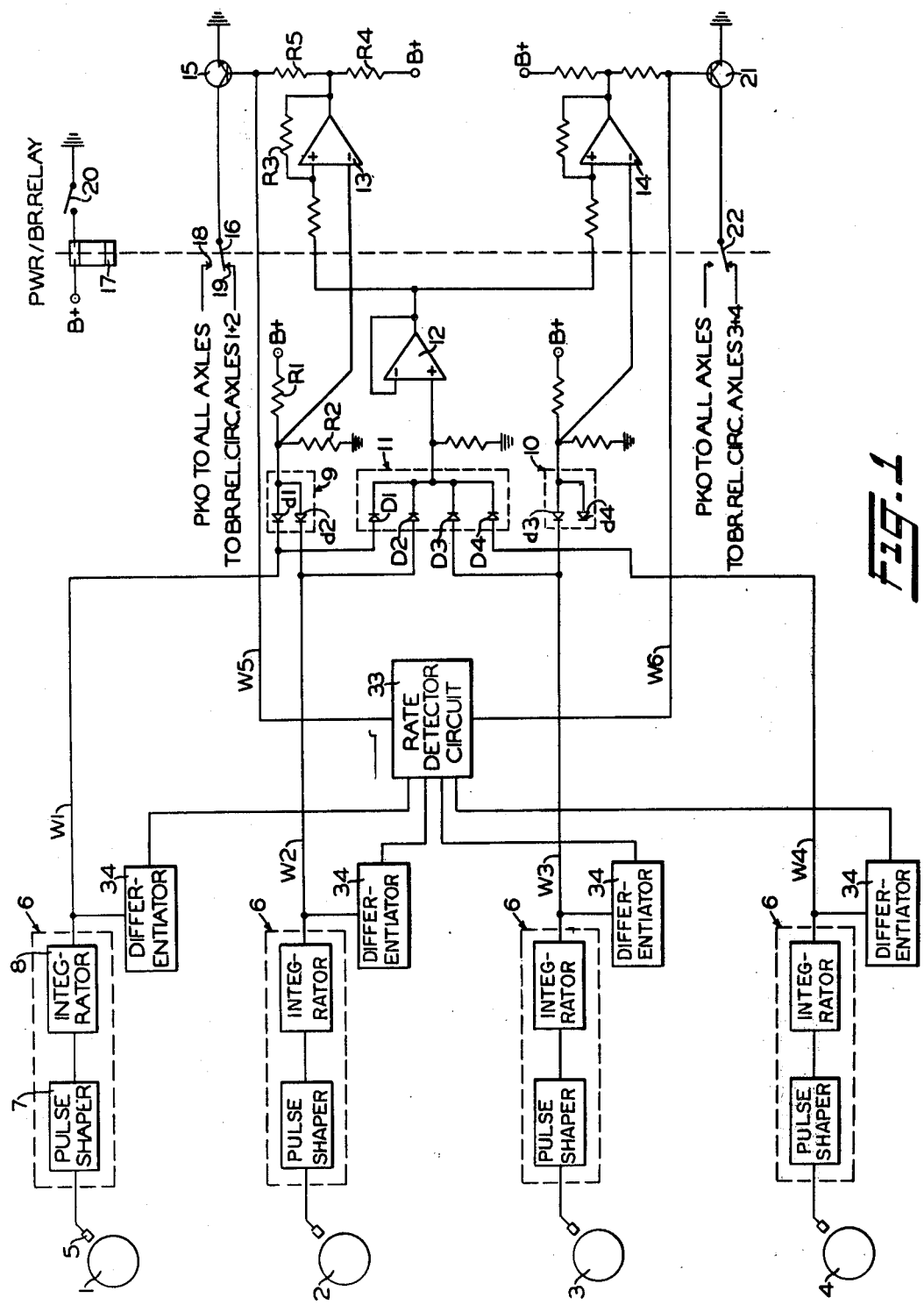

United States Patent [19]

Pallof

[11] 3,912,034

[45] Oct. 14, 1975

[54] VELOCITY COMPARISON CIRCUIT FOR WHEEL SLIP CONTROL SYSTEM

[75] Inventor: Julius Pallof, West Mifflin, Pa.

[73] Assignee: Westinghouse Air Brake Company, Wilmerding, Pa.

[22] Filed: Oct. 25, 1972

[21] Appl. No.: 300,844

[52] U.S. Cl. ............ 180/82 R; 188/181 C; 192/3 R; 303/21 EB; 318/52; 340/62
[51] Int. Cl. .................... B60k 27/02; B60t 8/10
[58] Field of Search ....... 180/82 R; 188/181; 192/2, 192/3 R; 303/20, 21; 324/161–162; 340/52 R, 53, 263, 62; 317/5; 307/10 R; 318/52

[56] References Cited
UNITED STATES PATENTS

| | | | |
|---|---|---|---|
| 3,260,555 | 7/1966 | Packer | 303/21 EB |
| 3,482,887 | 12/1969 | Sheppard | 303/21 BE |
| 3,535,004 | 10/1970 | Howard et al. | 303/21 EB |
| 3,583,773 | 6/1971 | Steinbrenner et al. | 303/21 EB |
| 3,608,978 | 9/1971 | Neisch | 303/21 EB |
| 3,608,979 | 9/1971 | Coyle | 303/21 EB |
| 3,671,083 | 6/1972 | Matsumura | 303/21 BE |
| 3,672,730 | 6/1972 | Burckhardt et al. | 303/21 BE |
| 3,764,182 | 10/1973 | Andreyko et al. | 303/21 EB |

*Primary Examiner*—Trygve M. Blix
*Assistant Examiner*—Stephen G. Kunin
*Attorney, Agent, or Firm*—R. W. McIntire, Jr.

[57] ABSTRACT

A wheel slip control system is provided which employs a unique velocity comparison technique of detecting a wheel slip condition by utilizing diode networks arranged to provide voltage signals representative of the higher and/or lower angular velocity of the wheels being monitored. Either the higher or lower voltage signal may be selected for use as a reference signal to be compared with speed signals representing the angular velocity of the different wheels. In braking mode of operation, the higher signal is chosen as the reference signal, while the lower signal is selected as the reference in propulsion mode of operation. Any difference in the reference signal and any one of the wheel speed signals is indicative of the wheel whose speed signal differs from the reference signal being in a slipping condition.

5 Claims, 3 Drawing Figures

VELOCITY COMPARISON CIRCUIT FOR WHEEL SLIP CONTROL SYSTEM

BACKGROUND OF THE INVENTION

The necessity for a vehicle borne wheel slip detection apparatus is generally recognized as fundamental in bringing modern high speed railway trains to a safe stop without extreme interaction between the cars of the train. Occasions of wheel slip arising are greatly increased with the higher rates of retardation employed in modern, high speed rail transit service, especially where the brake control system fails to compensate for the normal peaking of brake forces near the end of a stop, due to the increased coefficient of friction incident to decreasing wheel speed. This wheel slip problem becomes more critical in densly populated territory, where maximum utilization of facilities is sought in attempting to maintain minimum headways and high average speeds dictated by stringent train operating schedules.

The term wheel slip, as herein used, refers to a rotating wheel whose angular velocity differs slightly from the speed of the vehicle. Depending upon whether the vehicle is in braking or propulsion, wheel slip is considered the incipient stage of wheel slide, in which condition the vehicle wheels become locked against rotation, and is considered the incipient stage of wheel spin, in which condition of a rapid, uncontrolled acceleration of the wheels occurs, respectively. Wheel slide is objectionable not only because of the obvious loss of retarding effort, but also because of wheel damage due to flat spots being worn on the wheel tread as the wheel is dragged along the rail, and a general unsafe operating condition including rough train action. Wheel spin is objectionable in that loss of tractive effort is unavoidable.

In attempting to provide a relatively simple velocity comparison system of wheel slip control on a railway vehicle, it is common practice to select wheel/axle units comprising the separate trucks on which the vehicle is supported for comparison with each other. Experience has shown, however, that vehicle dynamics tend to encourage simultaneous response of the wheel/axle units of the same truck, so that synchronous wheel slip is likely to result, which would escape detection by the velocity comparison circuitry. Of course, more complicated arrangements are well known which provide for comparison of every possible combination of wheel/axle units and therefore have the capability of detecting all conditions of synchronous wheel slip except where all wheels being compared are slipping in unison. Such a complicated system is not only expensive, however, but also more prone to failure.

SUMMARY OF THE INVENTION

The object of the present invention is to provide a wheel slip control system of the comparison type which is simpler in construction than prior art schemes and therefore less prone to failure, yet which is capable of detecting a wheel slip of any one wheel/axle unit or of a group of wheel/axle units slipping in unison.

It is an extension of the above object to provide a wheel slip control system having a diode network which can be arranged to select a voltage signal generated by either the fastest and/or slowest one of the wheel/axle units being monitored as a reference signal for comparison either with each other or with voltage signals generated by each individual wheel/axle unit to detect a wheel slip condition.

It is axiomatic of course that the mode of vehicle operation dictates whether the detected wheel slip condition is an incipient slide or spin and of the corrective action to be taken, accordingly.

In fulfilling the objects of the invention, there is provided in a first embodiment a high voltage selector network and first and second low voltage selector netowrks. The high voltage selector network is comprised of a diode for each of the four wheel/axle units of a railway vehicle. A tachometer generator associated with each of the wheel/axle units supplies a voltage signal to a respective one of the diodes via appropriate pulse shaping circuitry representative of the angular velocity of the respective wheel/axle unit. The diode configuration of the high voltage selector network is such as to produce an output voltage corresponding to the velocity of the fastest rotating one of the four wheel/axle units. The high voltage selector network output is connected as a reference signal to one input of a pair of comparators.

The first low voltage selector network is subject to voltages generated by the wheel/axle units comprising one of the vehicle trucks while the second low voltage selector network is subject to the voltages generated by the wheel/axle units of the other truck. Thus, each of the low voltage selector networks include a pair of diodes arranged to produce an output voltage corresponding to the velocity of the slowest one of the wheel/axle units of a separate truck, one output being connected to the other input of one of the comparators and the other output being connected to the other input of the other comparator. Whenever a predetermined voltage differential arises between the lowest voltage output and highest voltage output effective at either one of the comparators, a discrepancy signal is indicated. In that the output of the highest voltage selector network is connected as the reference signal at each of the comparators, a discrepancy signal at either one of the comparators during braking mode of operation provides an indication of a wheel slip condition existing at one of the wheel/axle units of the truck associated with that particular comparator, and therefore logic circuitry is provided to release the brake forces on the appropriate wheel/axle units on a per truck basis. In propulsion mode of operation, however, a wheel slip indication by either one of the comparators can not be interpreted as an indication of which particular truck a wheel slip has occurred, and therefore logic circuitry is provided to interrupt power to the traction motors driving each of the wheel/axle units.

In a second embodiment of the invention, the first and second low voltage selector networks are eliminated and additional comparators are provided, one for each wheel/axle unit. The output of the high voltage selector network is connected as a reference signal to one input of each of the four comparators, while the other input of each comparator is subject to a voltage signal corresponding to the angular velocity of the wheel/axle unit associated with that particular comparator. Accordingly, a comparator output provides an indication during braking mode of operation that a wheel slip condition exists at the particular wheel associated with that comparator. As in the first embodiment, selection of the reference signal from the wheel/axle unit having the fastest rotating velocity prevents knowledge of the particular wheel/axle unit which is slipping in propulsion mode of operation, so that logic circuitry is required to interrupt power to all of the wheel/axle units.

In a third embodiment of the invention, a low voltage diode selector network as well as a high voltage diode selector network is provided, each having four diodes arranged to monitor each of the four wheel/axle units to select both the highest and lowest voltage generated by the fastest and slowest rotating wheel/axle unit. Switching means under control of a relay operatively responsive to the brake or propulsion mode of control accordingly selects as the reference signal the higher or lower voltage signal, respectively, for connection to the one input of each comparator. As in the second embodiment, each comparator is supplied a voltage signal at its other input corresponding to the angular velocity of the wheel/axle unit associated with that particular comparator. Accordingly, an output signal from any one of the comparators provides an indication that the particular wheel/axle unit associated therewith is slipping, there being appropriate logic circuitry to either reduce braking or remove power to that particular wheel/axle unit depending upon the mode of vehicle operation.

Figure 2:
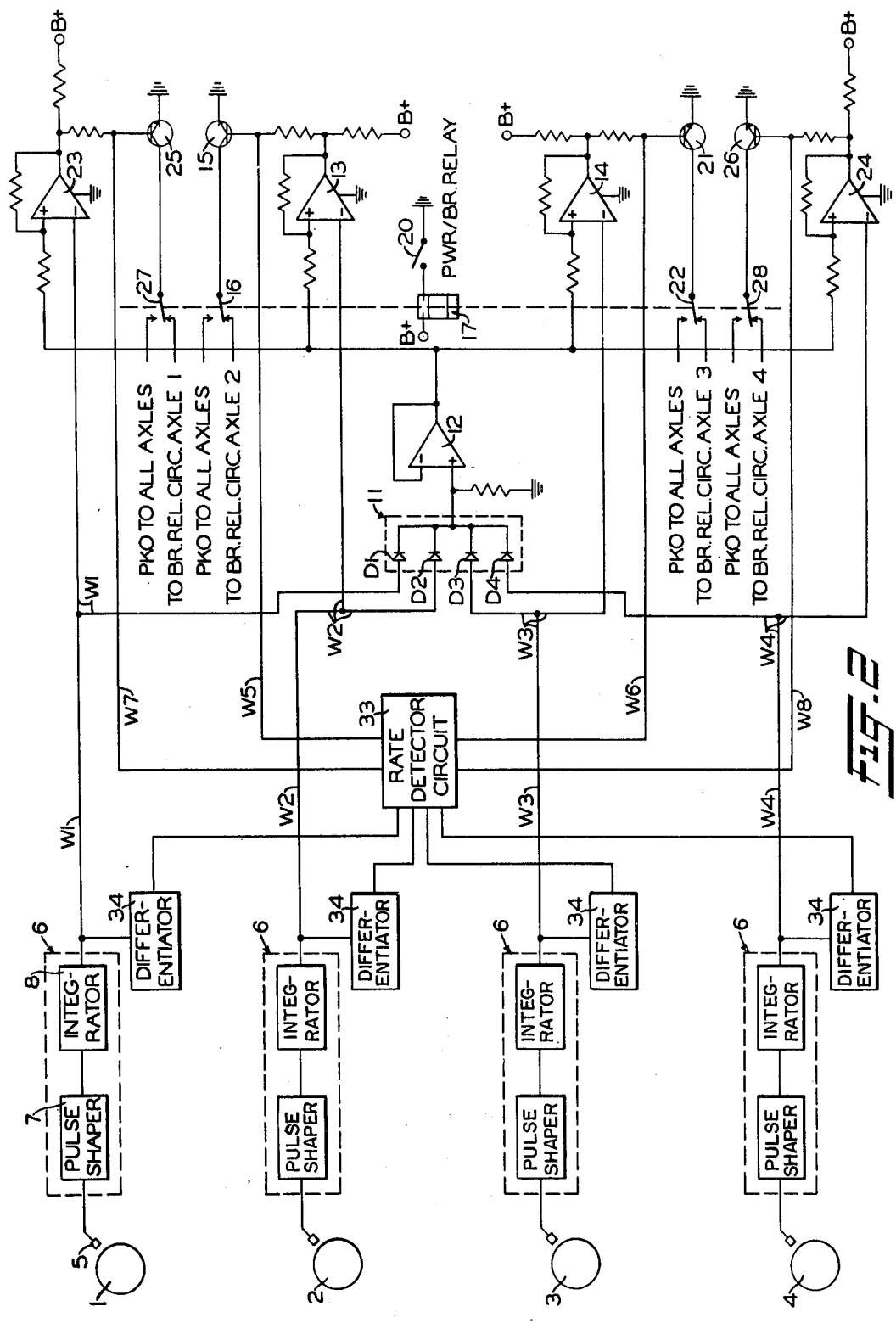
Figure 3:
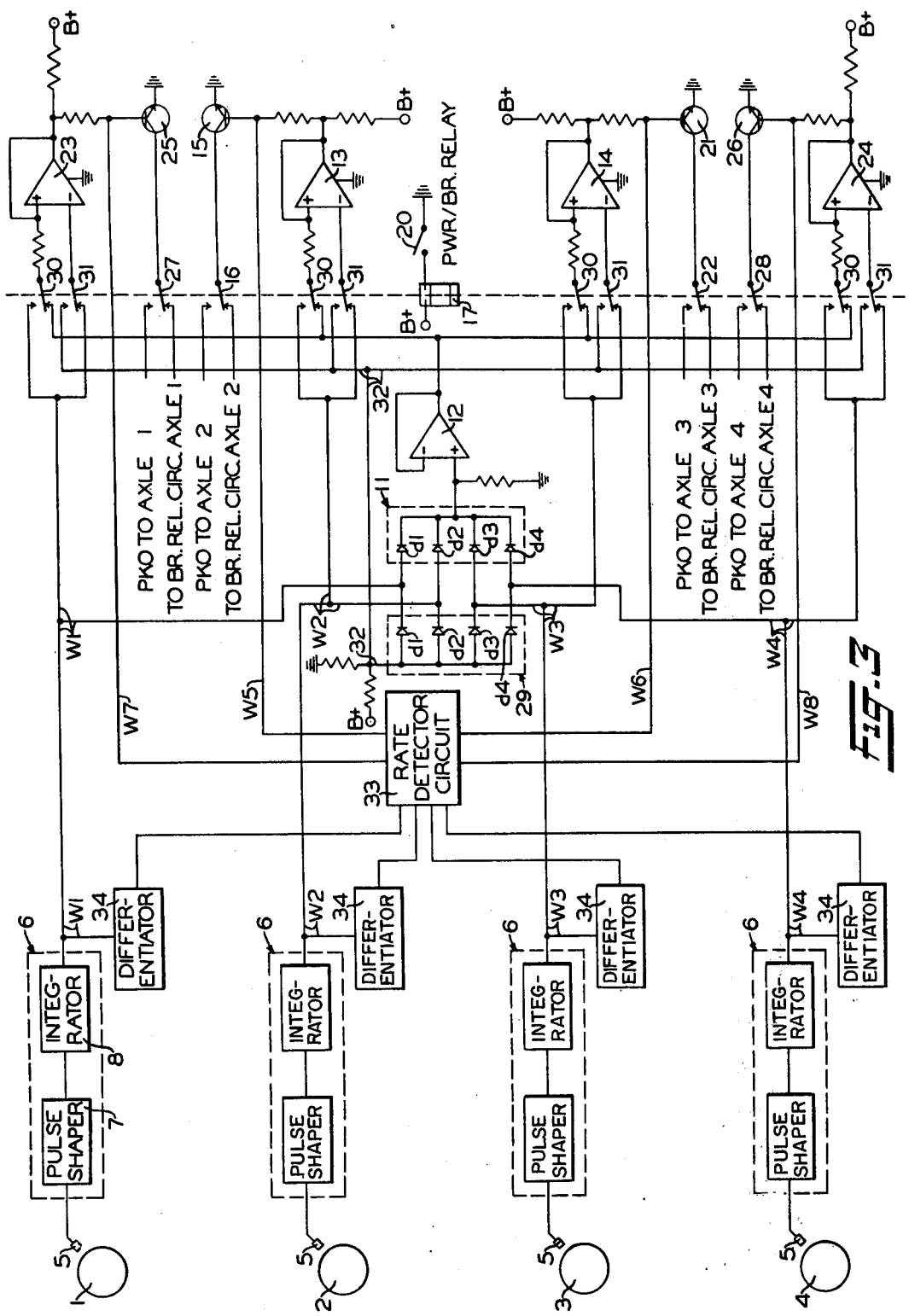

Other objects and attendant advantages of the invention will appear in the following more detailed description when considered with drawings of which:

FIG. 1 is a circuit diagrammatic of one embodiment of the invention, which has the capability of indicating a wheel slip condition on one of the pair of trucks of a railway vehicle operating in a braking mode;

FIG. 2 is a circuit diagrammatic of another embodiment of the invention having the capability of indicating a wheel slip condition of any one of the wheel/axle units of a railway vehicle operating in a braking mode; and FIG. 3 is a circuit diagrammatic of a different embodiment of the invention having the capability of indicating a wheel slip condition of any one of the wheel/axle units of a railway vehicle when operating in either a braking or a propulsion mode.

DESCRIPTION AND OPERATION

Referring now to FIG. 1 of the drawings, there is shown wheel/axle units 1, 2, 3 and 4, each having associated therewith a tachometer generator 5 which may be of a conventional type having a magnetic pickup capable of sensing in a well known manner the spaced teeth of a drive gear arranged on the wheel/axle unit. Wheel/axle units 1 and 2 comprise a railway truck supporting one end of a railway vehicle, while units 3 and 4 comprise the railway truck at the opposite end of the railway vehicle. Associated with the tachometer generator 5 of each wheel/axle unit is a frequency to voltage convertor 6, the output of which is a voltage signal representative of wheel/axle speed. Convertor 6 comprises a pulse shaper circuit 7 and an integrator circuit 8. Tachometer generators 5 produce an alternating current signal, the frequency of which varies with the rotating speed of the respective wheel/axle units. This a. c. signal is fed to pulse shaper circuit 7 where it is shaped, into a constant amplitude, constant width, square wave pulse having a repition rate proportional to the frequency of the a. c. input signal. The pulse shaped signal is in turn supplied to integrator circuit 8, where it is acted upon to produce an analog voltage signal at the output of frequency to voltage convertor 6, the amplitude of which varies with the angular velocity of the wheel/axle unit being monitored. Details of the pulse shaping and integrating circuits 7 and 8 are conventional and well known and, therefore, a detailed description is not believed to be necessary for an understanding of the invention. The speed signals at the outputs of the voltage to frequency convertors 6 are impressed upon conductors W1, W2, W3 and W4.

Connected via conductors W1 and W2 to a low voltage diode selector network 9 comprising diodes d1 and d2 is the output voltage signal from frequency to voltage convertors 6 associated with wheel/axle units 1 and 2. Similarly, the output voltage signal from frequency to voltage convertors 6 associated with wheel/axle units 3 and 4 is connected to a low voltage diode selector network 10 comprising diodes $d3$ and $d4$ via conductors W3 and W4. A high voltage diode selector network 11 comprising diodes D1, D2, D3 and D4 is supplied the voltage signals effective at conductors W1, W2, W3 and W4.

Each of the conductors W1, W2, W3 and W4 is connected to the anode terminal of a respective one of the diodes D1, D2, D3 and D4. The diode cathode terminals are each connected to a common juncture to which the positive terminal of a buffer amplifier 12 is connected. The output of amplifier 12 is connected to the positive terminal of a pair of normally conducting operational amplifiers 13 and 14 used as comparators. Buffer amplifier 12 isolates high voltage diode selector network 11 from amplifiers 13 and 14 to prevent the voltage in the feedback networks thereof from affecting the output of diode network 11. The resister R3 comprising the feedback network of amplifiers 13 and 14 adjusts the amplifier gain to provide hysteresis and thereby prevent undesirable cycling of the wheel slip control action, as hereinafter explained. The manner of interconnecting the cathode terminals of diodes D1 through D4 results in all but the diode having the highest anode voltage being reverse biased by the voltage of the conducting diode, which is reflected at the input of buffer amplifier 12 and accordingly serves as a reference speed signal at comparators 13 and 14 representative of the fastest rotating one of wheel/axle units 1, 2, 3 and 4.

Connected to the cathode terminals of diodes d1 and d2 of low voltage diode selector network 9 are conductors W1 and W2, while the anode terminals of these diodes are interconnected at a common juncture, which is in turn connected to the center tap of a voltage divider network comprising resister R1 and R2. Connected in turn to the center tap of the voltage divider network is the negative terminal of comparator 13. The voltage divider network is provided with a source of energy at terminal B+, with the center tap voltage effective at the anodes of diodes d1 and d2 being clamped substantially at the lower value of the cathode voltages. Consequently, the negative input of comparator 13 is provided with a signal representative of the slower rotating one of the wheel/axle units 1 and 2 comprising one of the trucks supporting a railway vehicle.

Diodes $d3$ and $d4$ comprising low voltage diode selector network 10 are interconnected in a similar fashion so as to present at the negative terminal of comparator 14 a voltage signal representative of the slower rotating one of wheel/axle units 3 and 4 comprising the other truck of the railway vehicle.

Anytime the reference signal at the positive input of comparators 13 and 14 exceeds the voltage signal at the negative input by a predetermined amount, as for example 6.0 volts, the operational amplifier comprising comparators 13 and 14 is switched from a normally conducting state to a non-conducting state.

In the non-conducting state of operational amplifier 13, a source of energy at terminal B+ supplies current flow to the base terminal of a transistor 15 via resistors R4 and R5, to switch the transistor to a conducting state in which current flow is established between the collector and emitter terminals of the transistor. A switch armature 16 of a relay 17 connects either a power knockout circuit, via front contact 18, or a brake release circuit, via back contact 19, to the transistor collector terminal. Relay 17 is energized by closure of a switch 20 in a propulsion mode of operation to pick-up armature 16, and is deenergized when switch 20 is opened in a braking mode of operation to drop-out armature 16. Preferably, the position of switch 20 is automatically selected in accordance with the mode of vehicle operation. Depending upon the position selected, either the brake release or power knockout circuit is set up for energization when transistor 15 is switched into conduction.

In the normally conducting state of operational amplifier 13 prior to the predetermined voltage differential being established between its positive and negative input terminals, current flow to the base terminal of transistor 15 is essentially cut off, the path of easy current flow being from terminal B+ to ground via resistor R4 and the conducting operational amplifier 13. Transistor 15 is accordingly switched to a non-conducting state in which energization of the pre-selected power knockout or brake release circuit is withheld.

A transistor 21 is similarly arranged with operational amplifier 14 to effect energization of the power knockout and brake release control circuitry, as selected by a switch armature 22 of relay 17, to control wheel slip on wheel/axle units 3 and 4.

If it is now assumed that wheel/axle units 2, 3 and 4 are rotating in synchronism at a higher speed than wheel/axle unit 1, tachometer generator 5 acting through frequency to voltage convertor 6 associated with wheel/axle unit 1 will establish a lower voltage speed signal at conductor W1 than will be impressed on conductors W2, W3 and W4 by the respective generators 5 and convertors 6 associated with wheel/axle units 2, 3 and 4.

High voltage selector network 11 thus reflects at its output a voltage corresponding to the speed of wheel/axle units 2, 3 and 4, while the output of low voltage network 9 is a voltage corresponding to the speed of wheel/axle unit 1, and the output of low voltage network 10 is a voltage corresponding to the speed of wheel/axle units 3 and 4, since their speeds are the same. Buffer amplifier 12 operates as a voltage follower to impress on the positive terminal of each amplifier 13 and 14 the voltage at the output of voltage selector network 11. Concurrently, the negative terminal of amplifier 13 is impressed with the voltage effective at the output of voltage selector 9, while the negative terminal of amplifier 14 is subject to the voltage at the output of voltage selector network 10. Accordingly, there is a voltage differential established between the positive and negative terminals of amplifier 13, which is consequently switched to a non-conducting state when the differential exceeds a predetermined value, as for example 6.0 volts. At amplifier 14, however, the voltage signals at the positive and negative terminals are identical so that amplifier 14 remains in its normally conducting state.

When amplifier 13 becomes non-conducting, transistor 15 is switched into conduction to effect energization of either the power knockout circuit or brake release circuit, dependent on the mode of vehicle operation. In a braking mode of operation, for instance, switch 20 is in the open position shown, in which relay 17 is deenergized, causing armature 16 to be engaged with back contact 19 associated with the brake release means on the vehicle truck comprising wheel/axle units 1 and 2. Accordingly, the braking effort on wheel/axle units 1 and 2 is relieved. It will be recognized therefore that in the present embodiment of the invention brake release control of a wheel slip condition is realized on a per truck basis so that when any one wheel/axle unit is out of sychronization, a brake release is enforced on both wheel/axle units of that particular truck.

When amplifier 13 becomes non-conducting, as above explained, the voltage established at the junction between resistors R4 and R5, which form a voltage divider, produces current flow in the amplifier feedback circuit comprising resistor R3. This raises the voltage signal at the positive terminal of amplifier 13, thereby driving the amplifier into a condition of saturation in which the non-conducting state of the amplifier is positively established. This assures that a release of the brakes will occur sufficient to allow the slipping wheel/axle unit 1 to regain rotation substantially in synchronism with wheel/axle units 2, 3 and 4 before normal brake control is restored. The purpose in providing this hysteresis effect is to limit excessive cycling of the control circuitry due to fast system response and due to ripple current. Buffer amplifier 12 at this time isolates the feedback voltage from the diodes comprising voltage selector network 11.

In the propulsion mode of operation, switch 20 is closed, energizing relay 17 to pick-up armature 16 and 22 into engagement with their respective front contacts 18, thereby causing the power knockout circuit associated with the conducting transistor 15 to be energized. It should be recognized, however, that since the high voltage selector network output is selected as the reference signal at each of the amplifier positive terminals, the circuitry of the present invention does not have the capability of providing information as to exactly which truck a wheel/axle unit is slipping during propulsion. Accordingly, when either one of the transistors 15 and 21 are conducting, power is interrupted at each wheel/axle unit of both trucks so that no propulsion is available on the vehicle.

In FIG. 2 of the drawings is shown an embodiment of the invention in which brake release control is provided on an individual wheel/axle unit basis. The arrangement differs from that of FIG. 1 only in that the low voltage diode selector networks 9 and 10 are eliminated in favor of two additional operational amplifiers 23 and 24 which, together with amplifiers 13 and 14, are each connected at their negative terminal to a different one of the conductors W1, W4, W2 and W3, respectively. The additional amplifiers 23 and 24 are also arranged with a transistor 25 and 26 respectively for controlling energization of either a powerknockout circuit or a brake release circuit, as selected by relay armatures 27 and 28 under control of relay 17.

If any one of the wheel/axle units is rotating slower than the fastest rotating wheel/axle unit, a voltage differential will occur at the comparator amplifier associated with that particular wheel/axle unit. For example, if the rotating frequency of wheel/axle unit 2 is less than the other wheel/axle units 1, 3 and 4, which are rotating in synchronism, high voltage diode selector network 11 will establish a voltage signal at the positive terminal of each amplifier 23, 13, 14 and 24 corresponding to the synchronous speed at which wheel/axle units 1, 3 and 4 are rotating. Since this reference voltage signal corresponds substantially to the voltage signal impressed on the negative terminals of amplifiers 23, 14 and 24, only amplifier 13 sees a voltage differential at its input terminals. Due to the slower speed of wheel/axle unit 2, a speed signal is supplied via conductor W2 to the negative terminal of amplifier 13 which is less than the speed signal at the positive import terminal by an amount corresponding to the predetermined differential required to switch amplifier 13 to a nonconducting state. Thus, only amplifier 13 switches from its normally conducting state to a non-conducting state in which transistor 15 becomes conductive to energize the release control circuit of wheel/axle unit 2 when the vehicle is in a braking mode of operation, as shown. In that wheel/axle unit 2 was assumed to be the slipping unit, it is apparent that this embodiment does provide the ability to recognize exactly which one of the wheel/axle units 1, 2, 3 and 4 may be slipping during a braking mode of operation. In propulsion mode of operation, all of the relay armatures are picked up, but only the conducting transistor 15 is effective to energize the power knockout circuitry which, as explained in the embodiment of FIG. 1, is arranged to interrupt power to each wheel/axle unit, since this particular embodiment also does not have the capability of determining which one of the wheel/axle units is slipping during a propulsion mode of operation.

In FIG. 3 of the drawings is provided a third embodiment of the invention, the purpose of which is to detect which wheel/axle unit may be slipping in propulsion, as well as in braking. The arrangement of FIG. 3 differs from that of FIG. 2 in that a single low voltage diode selector network 29 is provided in addition to the high voltage selector network 11, and additional relay armatures 30 and 31 of relay 17 are connected to the positive and negative terminals, respeoitvely, of each amplifier 23, 13, 14 and 24 in order to switch the outputs of the high and low voltage selector networks 11 and 29 between the positive and negative terminals, depending upon the mode of vehicle operation. This is necessary in order to maintain the correct direction of voltage differential at the amplifier terminals to assure proper amplifier operation, and to select the proper high or low voltage as the reference signal depending upon the mode of operation.

In braking mode of operation, relay 17 is deenergized and the relay armatures are dropped out so that the output of the high voltage selector network 11 is connected, as a reference signal, to the positive terminal of each amplifier 23, 13, 14 and 24 via buffer amplifier 12 and the back contacts of each relay armature 30. Also, conductors W1, W2, W3 and W4 are connected to the negative terminal of the respective amplifier 23, 13, 14 and 24 via the back contacts of each relay armature 31. In this sense the arrangement of FIG. 3 functions exactly the same as the FIG. 2 arrangement does during braking.

In propulsion mode, however, relay 17 is energized to pick up its relay armatures, so that the output of the low voltage diode selector network 29 is connected, as a reference signal, to the negative terminal of the respective amplifier 23, 13, 14 and 24 via conductor 32 and the front contacts of each relay armature 31. Also conductors W1, W2, W3 and W4 are connected to the negative terminal of each amplifier 23, 13, 14 and 24, respectively via the front contacts of each relay armature 30. It will be recognized therefore that when a wheel slip occurs during propulsion, indicative of a wheel/axle unit accelerating at an abnormal rate, the low voltage selector network provides the reference signal, as opposed to the reference signal being provided by the high voltage detector network during braking. This, of course, provides for detecting the particular wheel/axle unit that is slipping in propulsion.

The low voltage diode selector network 29 comprises diodes $d1$, $d2$, $d3$ and $d4$ having their cathode terminals connected to conductors W1, W2, W3 and W4 respectively. The anode terminals of diodes $d1$, $d2$, $d3$ and $d4$ are all interconnected with conductor 32, which is connected to the juncture of a voltage divider network comprising resistors R1 and R2 to which a source of voltage is supplied at terminal B+. Thus, low voltage selector network 29 is similar to low voltage selector networks 9 and 10 of FIG. 1 and operates in essentially the same manner to establish at its output the lowest voltage effective at conductors W1, W2, W3 and W4.

If wheel/axle units 2 and 4, for example, are rotating faster than wheel/axle units 1 and 3, the lower voltage effective at the conductors W1, W2, W3 and W4 is selected by network 29 and fed to the negative input of each amplifier 23, 13, 14 and 24, while the positive terminals of each amplifier is subject to the voltage generated by a different one of the wheel/axle units. This results in a voltage differential being established at amplifier 13 and 24, since the wheel/axle units 2 and 4 associated therewith are assumed to be slipping in propulsion or, in other words, spinning out of synchronism with wheel/axle untis 1 and 3. Accordingly, amplifiers 13 and 24 are switched to a non-conducting state, in turn causing transistors 15 and 26 to conduct. Since relay armatures 16 and 28 are picked up in propulsion mode of operation for engagement with their front contacts, the power knockout circuit associated with each wheel/axle unit 2 and 4 is energized as long as transistors 15 and 26 continue to conduct, thus resulting in interruption of power to the particular wheel/axle units that are slipping.

The three embodiments of the invention each may further include a rate detector circuit 33 in addition to the previously described velocity comparison circuit for detecting slipping wheel/axle unit. A differentiator circuit 34 associated with each wheel/axle unit is subject to the speed signal effective at the output of the respective frequency to voltage convertors 6. The differentiator circuits are conventional and act, in a well known manner, to perform a time derivation of the speed voltage to obtain a rate signal, one polarity of which occurs during deceleration of the wheel/axle unit and the opposite polarity of which results during acceleration. Rate detector circuit 33 may include as many circuits as necessary to monitor the differentiator rate signals and accordingly produce an output for controlling a slip on the appropriate wheel/axle unit when the rate signal associated therewith exceeds a predetermined threshold. In FIG. 1, only a pair of outputs are produced by the rate detector circuit 33, since the slip control is accomplished on a per truck basis. Conductors W5 and W6 connect the rate detector outputs to the base terminal of the respective transistors 15 and 21 to effect control thereof in parallel with comparator amplifiers 13 and 14. If either one of the rate signals arising from differentiators 34 associated with wheel/axle units 1 and 2 exceed a predetermined threshold, conductor W5 is energized to switch transistor 15 into conduction and accordingly effect either brake release control of the wheel slip condition on the truck comprising wheel/axle units 1 and 2, or power interruption at wheel/axle units 1, 2, 3 and 4, depending upon the mode of vehicle operation, and independently of the velocity comparison circuitry. Similarly, a wheel slip condition on either one of the wheel/axle units 3 and 4 results in conductor W6 becoming energized to switch transistor 21 into conduction. It is to be understood, of course, that the sensitivity of the rate detector circuit may be selected by adjusting the rate threshold value so as to normally give precedence to either the rate detector circuit or the velocity comparison circuitry, as desired.

The rate detector arrangement in FIGS. 1 and 2 is similar to FIG. 1 with the exception that additional conductors W7 and W8 are provided. The rate detector circuit 33 thus monitors each individual wheel/axle unit and energizes the conduit W5, W6, W7 or W8 to switch the appropriate transistor whose base terminal is connected therewith into a state of conduction, thereby effecting wheel slip control on the appropriate wheel/axle units in parallel with the velocity comparison circuitry.

Having now described the invention, what I claim as new and desire to secure by Letters Patent, is:

1. A wheel slip control circuit comprising:
   a. means for monitoring and converting the angular velocity of a plurality of rotating members into distinct speed signals;
   b. first signal selector means including a plurality of diodes each subject at its anode terminal to a respective one of said speed signals, the cathode terminals of said diodes being interconnected so as to establish the voltage conducted by said diodes at a value corresponding to the greater one of said speed signals to provide a high reference signal;
   c. second and third signal selector means each including:
      i. a voltage divider network to which a source of energy is supplied; and
      ii. at least two diodes subject at their cathode terminals to different ones of said speed signals associated with a first or second pair of said rotating members, the anode terminals of said diodes being interconnected at a center tap of said voltage divider network to establish the voltage thereat according to the lesser one of said speed signals of said first or second pairs of said rotating members to provide a low reference signal;
   d. first and second differential amplifiers each having a first input subject to said high reference signal and an output, said first amplifier having a second input subject to said low reference signal provided by one of said second or third signal selector means and said second amplifier having a second input subject to said low reference signal provided by the other one of said second or third signal selector means, said output of each of said amplifiers providing a comparison discrepancy signal when a predetermined signal differential occurs between said first and second inputs thereof; and
   e. first and second switch means operative according to a brake or propulsion mode of operation of said rotating members for connecting the output of said first and second amplifiers to either a brake or propulsion control circuit of at least a pair of said rotating members to effect a release of braking or power thereof responsive to said comparison discrepancy signal.

2. A wheel slip control circuit, as recited in claim 1, further characterized in that said brake control circuit effects a release of brake effort on said first or second pair of said rotating members depending upon said comparison discrepancy signal being provided by said first or said second differential amplifier.

3. A wheel slip control circuit, as recited in claim 1, further characterized in that said first and second amplifiers each include a feedback network between said first input and said output whereby said comparison discrepancy signal is effective to adjust said high reference signal in such sense as to increase said signal differential between said first and second inputs in excess of said predetermined differential to positively maintain said comparison discrepancy signal until the velocities of said rotating members are in substantial correspondence.

4. A wheel slip control circuit, as recited in claim 3, further comprising buffer amplifier means interposed between the cathode terminals of said diodes comprising said first signal selector means and said first input of said first and second differential amplifier for isolating said diodes comprising said first signal selector means from said adjusted high reference signal.

5. A wheel slip control circuit, as recited in claim 1, further comprising:
   a. differentiator means subject to different ones of said speed signals for providing corresponding rate signals representing the rate of change of the angular velocity of said rotating members, and
   b. rate detector means subject to said rate signals for providing a rate discrepancy signal when the rate of change of one of said speed signals exceeds a predetermined value, said rate discrepancy signal being connected via either said first or second switch means to said brake or propulsion control circuit in parallel with said comparison discrepancy signal.

* * * * *